No. 679,765.　　　　　　　　　　　　　　Patented Aug. 6, 1901.
G. W. MANSON.
SUPPORT FOR BICYCLES.
(Application filed Nov. 17, 1900.)
(No Model.)
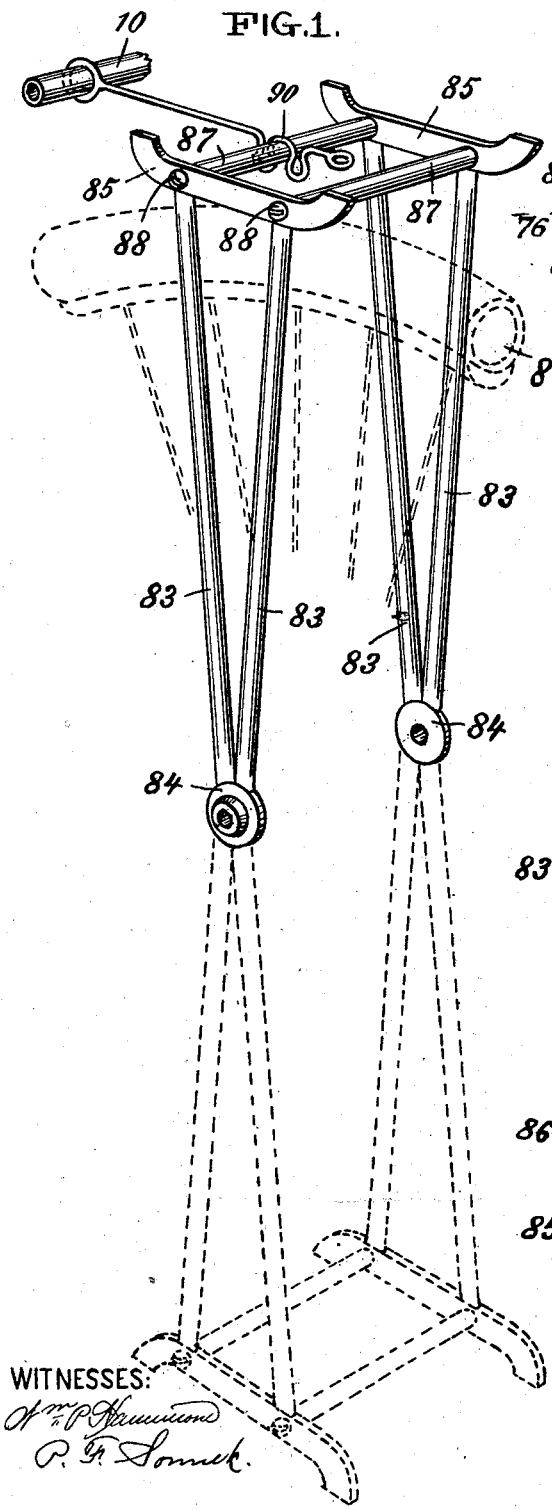
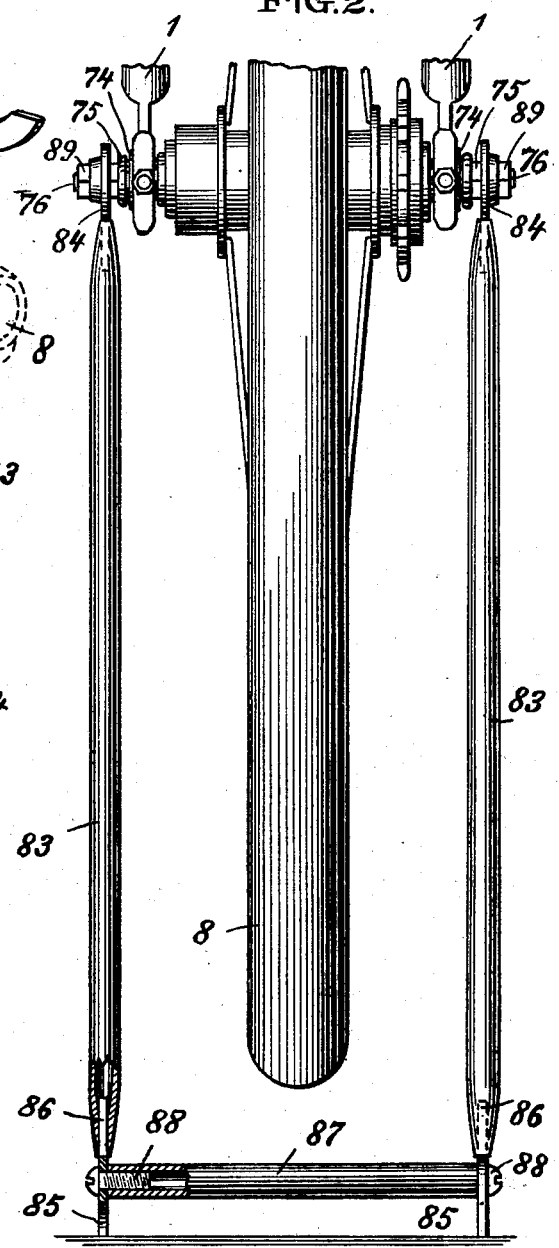
INVENTOR
Geo. W. Manson
BY
Knight Bros
ATTORNEYS
WITNESSES:

UNITED STATES PATENT OFFICE.

GEORGE W. MANSON, OF NEW YORK, N. Y.

SUPPORT FOR BICYCLES.

SPECIFICATION forming part of Letters Patent No. 679,765, dated August 6, 1901.

Application filed November 17, 1900. Serial No. 36,847. (No model.)

*To all whom it may concern:*

Be it known that I, GEORGE W. MANSON, a citizen of the United States, and a resident of the borough of Manhattan, in the city and State of New York, have invented a new and Improved Rest or Support for Bicycles, of which the following is a specification.

The subject of my invention is a rest or support adapted to be pivoted on the projecting ends of the fixed axle or spindle of the drive-wheel of a bicycle and when turned down to support the wheel off the ground and sustain the entire cycle in upright position and when turned up to serve as an upper mud-guard and skirt-protector while the wheel is running.

In the accompanying drawings, Figure 1 is a perspective view of the wheel-rest, showing it in full lines turned up, as when the wheel is running, and in dotted lines turned down in position to support the wheel off the ground. Fig. 2 is a rear elevation, partly in section, showing the rest turned down and a portion of the wheel on which it is mounted.

8 represents part of the rear or drive wheel of a bicycle; 76, the projecting ends of the fixed spindle or shaft thereof; 74, the customary washers; 75, nuts by which the hub of the wheel is retained on its bearings, and 1 1 portions of the bicycle-frame.

My improved rest is constructed with two pairs of diverging tubular arms 83, fixed at their inner ends to collars 84 and at their outer divergent ends to horizontal flat steel bars 85 85, formed with downturned ends and rigidly connected together, so as to constitute a base-shoe for the rest. The shoe-bars 85 have vertically-projecting studs or tenons 86, which are permanently fixed in the outer ends of the respective tubular arms 83, as shown in Fig. 2. Similar studs on the collars 84 are employed to fix thereto the inner ends of the tubular arms 83, as shown in dotted lines in Fig. 2. The shoe-bars 85 are connected and fixed at the proper distance asunder by tubular tie-rods 87, to the ends of which the shoe-bars are fixed by screws 88.

To apply the rest to a bicycle, the collars 84 are slipped over the projecting ends 76 of the fixed shaft and confined thereon by nuts 89, so as to be free to turn on the said shaft.

When the bicycle is to be used, the rest is turned up to the position shown in full lines in Fig. 1, over the top of the wheel, the position of which is indicated in dotted lines in the same figure, and the rest is retained in this elevated position by a hook 90, which is mounted on a cross-bar 10 of the seat-frame or any suitable part of the fixed frame. While in this position the rest constitutes an effective upper mud-guard or skirt-protector to prevent contact of the clothing of the rider with the wheel while the wheel is running.

In order to support the bicycle in upright position while at rest, the rest or support is turned down to the position shown in Fig. 2 and in dotted lines in Fig. 1, raising the wheel 8 off the ground and providing an effective supporting-base therefor.

Having thus described my invention, the following is what I claim as new therein and desire to secure by Letters Patent:

1. A supporting-rest for bicycles comprising two pairs of diverging tubular arms, a collar fixed to the inner ends of the respective pairs of arms, horizontal flat shoe-bars formed with downturned ends secured to the outer ends of the diverging arms, and tie-rods connecting the shoe-bars.

2. A supporting-rest for bicycles comprising two pairs of diverging tubular arms, a collar fixed to the inner ends of the respective pairs of arms, horizontal flat shoe-bars formed with downturned ends secured to the outer ends of the diverging arms, and tie-rods connecting the shoe-bars, in combination with a supporting-hook secured to a bicycle-frame adapted to engage and hold the support in elevated position.

GEORGE W. MANSON.

Witnesses:
OCTAVOUS KNIGHT,
WM. P. HAMMOND.